United States Patent [19]
Wilson

[11] Patent Number: 5,702,300
[45] Date of Patent: Dec. 30, 1997

[54] COMBINE ROCK DOOR OVER CENTER CLOSURE APPARATUS

[75] Inventor: Ronald E. Wilson, Lee's Summit, Mo.

[73] Assignee: AGCO Corporation, Independence, Mo.

[21] Appl. No.: 634,450

[22] Filed: Apr. 18, 1996

[51] Int. Cl.⁶ ...................................................... A01D 75/18
[52] U.S. Cl. ............................ 460/106; 460/2; 56/10.2 R
[58] Field of Search .......................... 460/106, 105, 460/2, 150, 119; 56/10.2 R

[56] References Cited

U.S. PATENT DOCUMENTS

| | | |
|---|---|---|
| 3,675,660 | 7/1972 | Girodat . |
| 3,756,248 | 9/1973 | Mathews . |
| 3,805,798 | 4/1974 | Girodat . |
| 3,971,390 | 7/1976 | McDuffie et al. . |
| 4,262,679 | 4/1981 | James . |
| 4,271,850 | 6/1981 | Ryczek . |
| 4,335,562 | 6/1982 | Meyers et al. . |
| 4,335,563 | 6/1982 | Rice et al. . |
| 4,335,564 | 6/1982 | Knepper . |
| 4,335,565 | 6/1982 | Knepper et al. . |
| 4,404,975 | 9/1983 | Westby . |
| 4,446,875 | 5/1984 | Deleu ........................... 460/106 |
| 4,484,588 | 11/1984 | Huhman et al. . |
| 4,616,661 | 10/1986 | Hanaway et al. . |
| 4,657,029 | 4/1987 | Helm et al. . |
| 5,324,231 | 6/1994 | Van Herpe et al. ................ 460/106 |

FOREIGN PATENT DOCUMENTS

0516892A1  9/1992  European Pat. Off. .

Primary Examiner—Terry Lee Melius
Attorney, Agent, or Firm—Litman, McMahon and Brown, L.L.C.

[57] ABSTRACT

An over center closure apparatus for a spring latched rock door for a combine harvester includes a first, free rotating lever arm connected to rotate about the rock door pivot and a second lever arm connected to rotate with the rock door pivot. The second lever arm includes a stop positioned to engage the first lever arm as it rotates about the rock door pivot. A linkage arm extends from the first lever arm downward to a over center lever arm in an over center assembly. The over center lever arm is positioned to rotate about a pivot axis between an over center position and a free rotating position such that, when the over center lever arm is rotated to the over center position, the rock door is closed and held in the closed position by the over center position of the over center lever arm. The rock door can then be conveniently latched closed.

15 Claims, 3 Drawing Sheets

COMBINE ROCK DOOR OVER CENTER CLOSURE APPARATUS

FIELD OF THE INVENTION

The present invention relates to a rock door over center closure apparatus for an agricultural combine harvester. More particularly, the inventive rock door closure apparatus includes a linkage arm attached at one end to a pivoting over center lever arm and at the other end to a lever arm attached to the rock door. Once the rock door has been tripped and sprung open by a rock, a wrench is attached to the over center lever arm and the wrench is used to pivot the over center lever arm to an over center position. This causes the linkage arm to pivot the lever arm attached to the rock door, which, in turn, pivots the rock door to a closed, unlatched position. The over center position of the over center lever arm acts to hold the rock door in the closed position so that it can be conveniently relatched.

BACKGROUND OF THE INVENTION

A constant problem for agricultural combine harvesters is dealing with rocks which are picked up along with the crop material. If a relatively large rock were to be pulled into a threshing mechanism, serious and expensive damage to the threshing mechanism is virtually assured, along with consequent down time of the machine during the critical harvesting period. Therefore it is essential that rocks be collected or expelled prior to entering the threshing mechanism.

One approach used in many combines is to use a rock "trap" positioned just behind the crop elevator and ahead of the thresher which trap usually forms a slot or trough in the floor. Since the rocks are considerably heavier than the crop material, the rocks fall into the trap due to gravity as the crop material passes over the trap. Alternatively some type of rock sensor can be used to sense the presence of the rocks and open a door into the trap when a rock is detected. When the trap is full, the combine must be stopped as the trap is emptied.

Alternatively a "rock door" can be provided in the floor of the combine just ahead of the threshing mechanism. Typically such rock doors are pivotably attached at one end and include a spring latch which normally maintains them in a closed, latched position. When the rock door is subjected to a predetermined amount of downward force, as from a rock being propelled against the door, the spring latch is forced open, thus releasing the rock door and allowing it to pivot downward to an open position. The rock then falls through the open rock door and out of the path of the threshing mechanism. A sensor is usually provided to indicate to an operator that the door has been sprung open since, with the door in an open position, crop material would also be fed through the open door. Examples of spring loaded rock doors are illustrated and described in detail in U.S. Pat. No. 4,262,679 to James, U.S. Pat. No. 4,271,850 to Ryczek, U.S. Pat. No. 4,484,588 to Huhman et al., and U.S. Pat. No. 4,616,661 to Hanaway et al., all of which are assigned to the present assignee and all of which are hereby incorporated by reference.

Reclosing and latching of rock doors such as those described in the above-mentioned patents, after they have been sprung open, has been a laborious and physically demanding task. For example, in rotary combines made by Gleaner, when a rock door is sprung open, reclosing it has involved some variation of the following steps. First, the operator shuts down the combine and opens a side access door to the combine. The rock, along with crop material and residue, must be removed from the pivot path of the rock door, typically with a broom, stick, etc. Next the operator would take two large wrenches and physically climb up into the combine to a position near the rock door. With his or her right hand, the operator then places a first of the wrenches on a wrench receiving head of the pivot of the rock door and rotates the door clockwise to a closed position. While holding this wrench and the attached door in the closed position with the right hand, with his or her left hand the operator places the second wrench on a wrench receiving head of a latch pin arm and rotates the second wrench in a counterclockwise direction to engage the latch pin between a pair of spring loaded roller pairs. The wrenches are then removed from their respective wrench receiving heads and stored in position, the access door is closed and the combine is ready for further harvesting.

This operation, including the simultaneous, opposite turning of a pair of large wrenches from a confined space and in a position above the operator's head, requires a considerable amount of physical strength and dexterity. Such strength and dexterity is not always possessed by combine operators due to circumstances of size, age, physical conditioning or other factors.

It is clear then, that a need exists for an improved apparatus of reclosing a spring latched rock door on an agricultural combine harvester. Such an apparatus should allow an operator to conveniently and relatively easily close and latch the rock door without the need to physically climb up into a confined space and without the need to simultaneously operate a pair of wrenches in opposite directions.

SUMMARY OF THE INVENTION

The present invention is directed to an over center closure apparatus for a combine rock door. The rock door has a pivot sleeve which accommodates a pivot rod extending inward from opposite sides of a threshing section of the combine to form a rock door pivot such that the rock door is pivotable between an upper, closed position and a lower, open position. A spring latch and a spring latch pin are provided on the rock door to latch it in place in the closed position. A first, free rotating lever arm is connected to rotate about the rock door pivot and a second lever arm is connected to rotate with the rock door pivot. The second lever arm includes a stop positioned to engage the first lever arm as it rotates about the rock door pivot. A linkage arm extends from the first lever arm downward to an over center assembly. The over center assembly includes an over center lever arm connected to the linkage arm and positioned to rotate about a pivot axis between an over center position and a free rotating position. The over center lever arm includes a wrench engaging head for accommodating a wrench equipped with a long handle. When the wrench is used to turn the over center lever arm to the over center position, the rock door is closed by the linkage arm and the first and second lever arms and it is held in the closed position by the over center position of the over center lever arm. The wrench can then be removed from the over center lever arm and, due to the length of the wrench handle, it can be placed on the rock door latch while the operator is standing on the ground, thus allowing the rock door to be conveniently latched from ground level. Once the rock door is latched, the over center lever arm is released from the over center position, thus preparing the rock door and the combine for further harvesting operations.

OBJECTS AND ADVANTAGES OF THE INVENTION

The principal objects of the present invention are: to provide a rock door over center closure apparatus for an agricultural combine harvester; to provide such a closure apparatus in which the rock door can be pivoted to a closed position and held there by the action of an over center lever arm rotated to an over center position; to provide such a closure apparatus which allows a rock door to be closed and latched with minimal physical effort; to provide such a closure apparatus which allows an operator to close and latch a rock door from ground level; and to provide such a closure apparatus which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
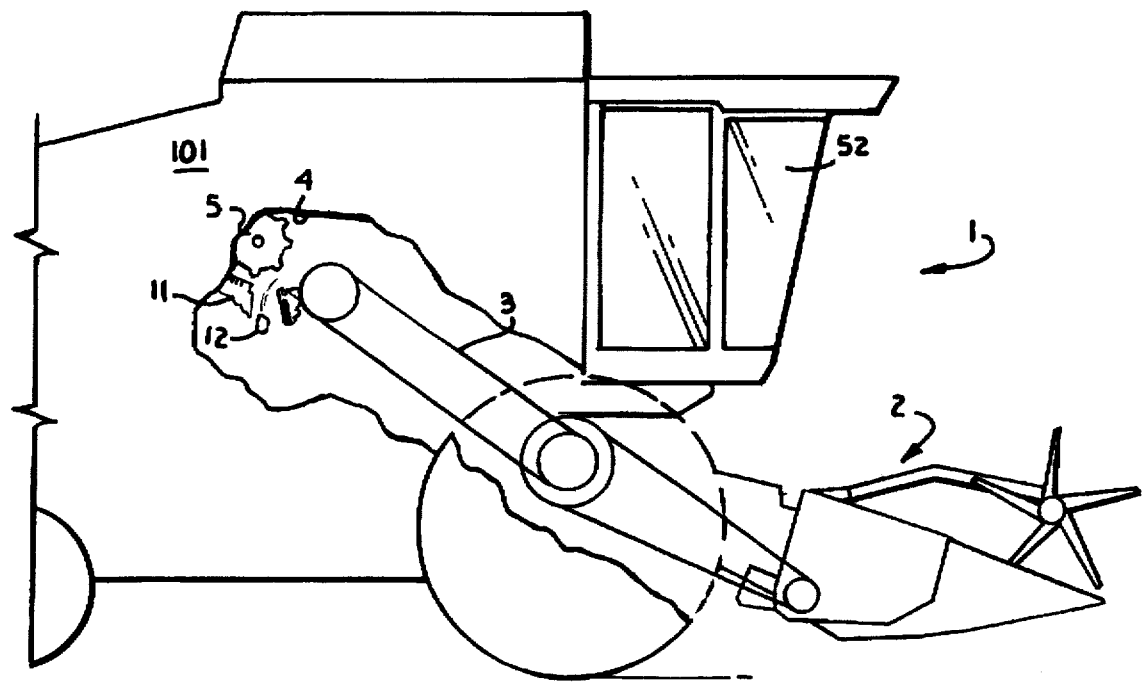
FIG. 1 is a fragmentary, partially schematic, side elevational view of the front end of a combine equipped with a rock door and a rock door over center closure apparatus in accordance with the present invention.

Referring to FIG. 1, a front portion of a combine harvester 1 is illustrated schematically. The combine 1 includes a header 2 for severing and delivering crop material to an elevator 3. The elevator 3 delivers the crop material from the header 2 up to a threshing section 4 which includes a thresher cylinder 5 operating over a concave 11. In a conventional fashion, the thresher cylinder 5 threshes the crop material, causing much of the grain to drop through the concave 11 while the crop residue passes through for further processing.

Figure 3:
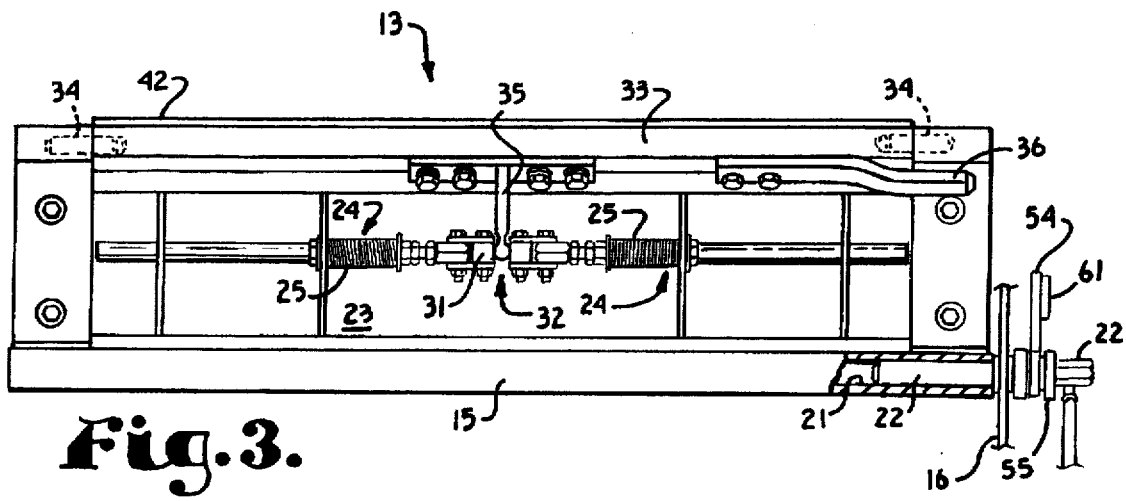
FIG. 3 is a bottom plan view of a rock door and a rock door pivot.

A problem occurs when a rock, such as the rock 12, is picked up by the header 2 and delivered to the threshing section 4 by the elevator 3. If the rock 12 were allowed to enter the threshing cylinder 5, then serious damage could occur to the threshing section 4, along with consequent down time of the combine harvester 1. Accordingly, a spring loaded rock door 13 is provided in a floor 14 of the threshing section 4 just ahead of the threshing cylinder 5. The rock door 13, as illustrated in FIG. 3, includes a main body 15 which is pivotably attached between an exterior side wall 16 and an interior wall (not shown) in the threshing section 4 of the combine 1 via an interior pivot sleeve 21 and a rigidly attached pivot rod 22 which rod 22 extends through an aperture in the side wall 16 to form a rock door pivot. Attached to a bottom 23 of the door main body 15 are a pair of opposing spring latch members 24, each of which includes a coil spring 25 and a split roller 31. Each coil spring 25 urges the respective split roller 31 toward the other split roller 31 to form a spring latch, generally indicated at 32.

Figure 6:
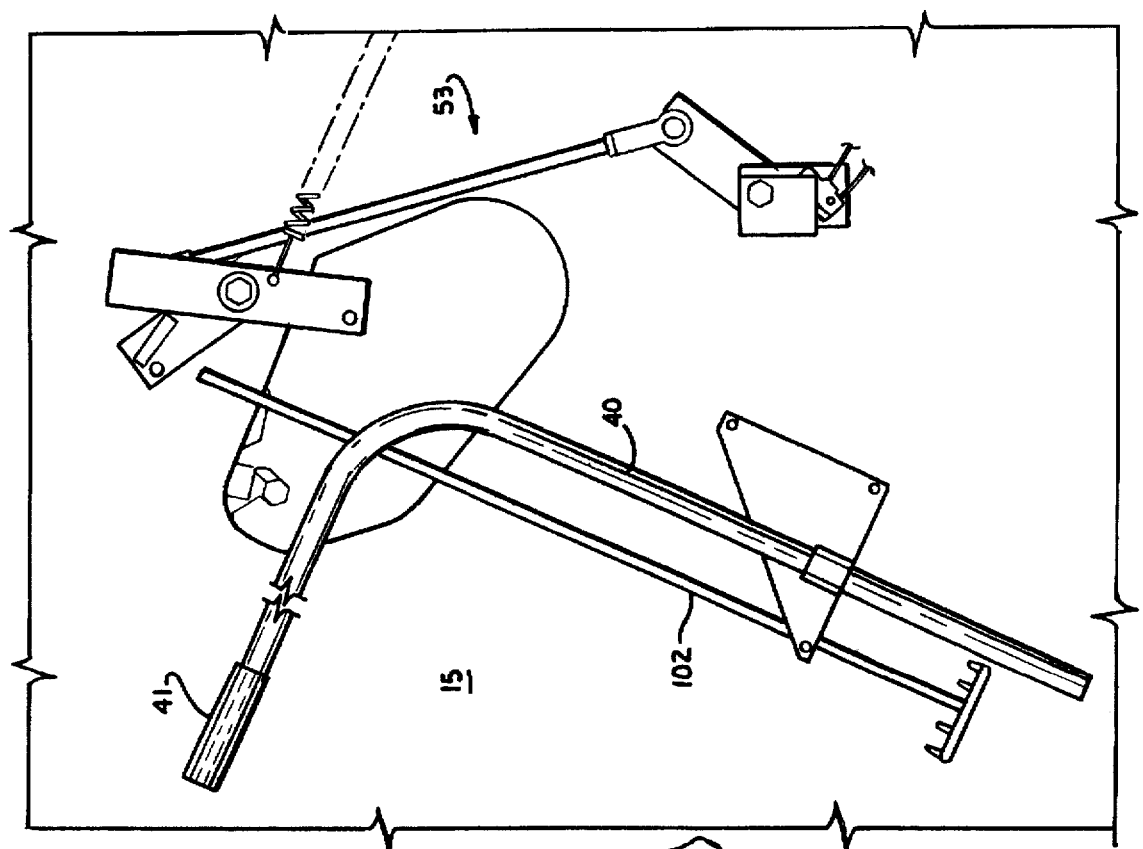
FIG. 6 is a fragmentary, schematic view of a portion of the combine proximate the rock door and over center closure apparatus, illustrating the storage of a wrench and rake for use with the over center closure apparatus.

A latch pin arm 33 is pivotably attached to the door main body 15 via a pair of pivot pins 34. The arm 33 includes a latch pin 35 which is positioned to be inserted between the pair of split rollers 31 when the arm 33 is pivoted to a latch position. A wrench engaging head 36 is attached to the latch pin arm 33 to accommodate a socket end 41 of a wrench 40 (FIG. 6). The latch pin arm 33 also includes a ledge 42 extending thereacross which ledge 42 is positioned to engage a detent 43 in the concave 11 (FIG. 4) when the latch pin arm 33 is pivoted inward and the latch pin 35 is held between the pair of split rollers 31.

Rock Door Operation

The rock door 13 is a safety feature which prevents rocks, such as the rock 12, from entering the threshing mechanism, including the thresher cylinder 5. When the rock door 13 is pivoted upward to the closed, unlatched position shown in FIG. 3, the wrench 40 is used to engage the wrench engaging head 36 on the latch pin arm 33. The wrench 40 is then turned in a counterclockwise direction, causing the latch pin 35 to engage the opposing split rollers 31, thus latching the ledge 42 of the latch pin arm 33 in the extended position of FIG. 2, i.e. engaging the detent 43. This latches the rock door 13 in the closed and latched position of FIG. 2.

When a rock, such as the rock 12, is introduced into the combine harvester 1 via the header 2 and the elevator 3, it drops off of the elevator 3 next to the thresher cylinder 5. One of a plurality of thresher teeth 44 on the thresher cylinder 5 then forces the rock 12 downward onto a top surface 45 of the rock door 13. The downward momentum of the rock 12, as it strikes the door 13 jars the latch pin 35 out of engagement with the spring latch 32. This causes the latch pin arm 33 to pivot in a clockwise direction, thus releasing the ledge 42 from engagement with the detent 43 and allowing the rock door 13 to pivot downward to the open position shown in FIG. 4. The rock 12 is thus allowed to drop through an opening 45 in the floor 14 created by the open door 13. A rock door open limit switch 51 is positioned to sense the open rock door 13 and to enable a warning indicator (not shown) in an operator's cab 52 to indicate to the operator that the combine 1 must be stopped and the rock door 13 closed and relatched.

Over Center Closure Apparatus

Figure 2:
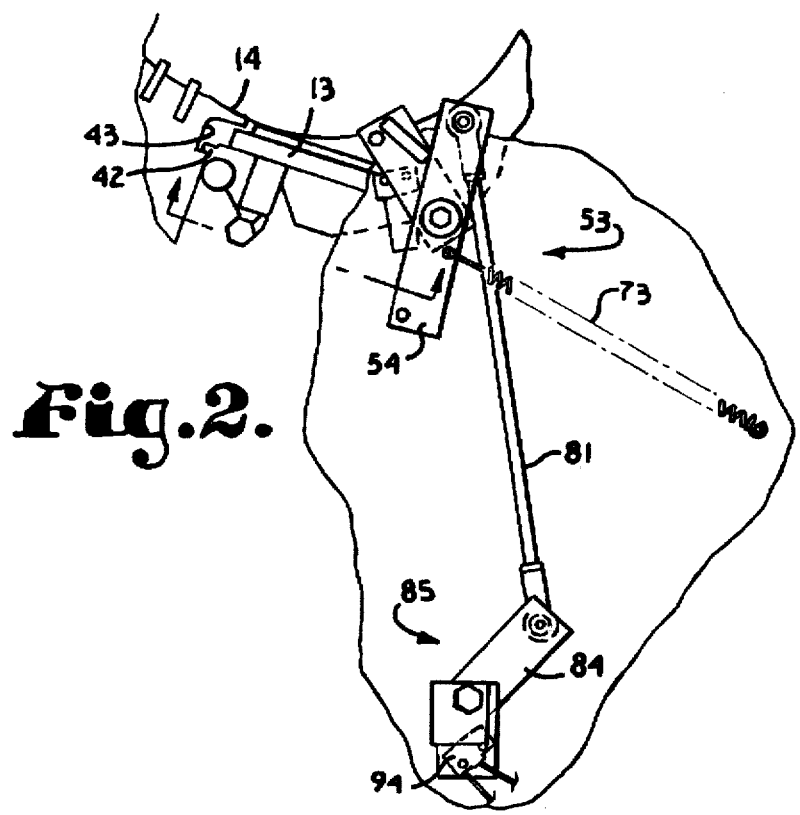
FIG. 2 is a greatly enlarged, fragmentary side elevational view of a portion of the combine including the rock door and an over center closure apparatus with portions of a combine side wall broken away to illustrate the rock door in a closed and latched condition and with an over center lever released.
Figure 4:
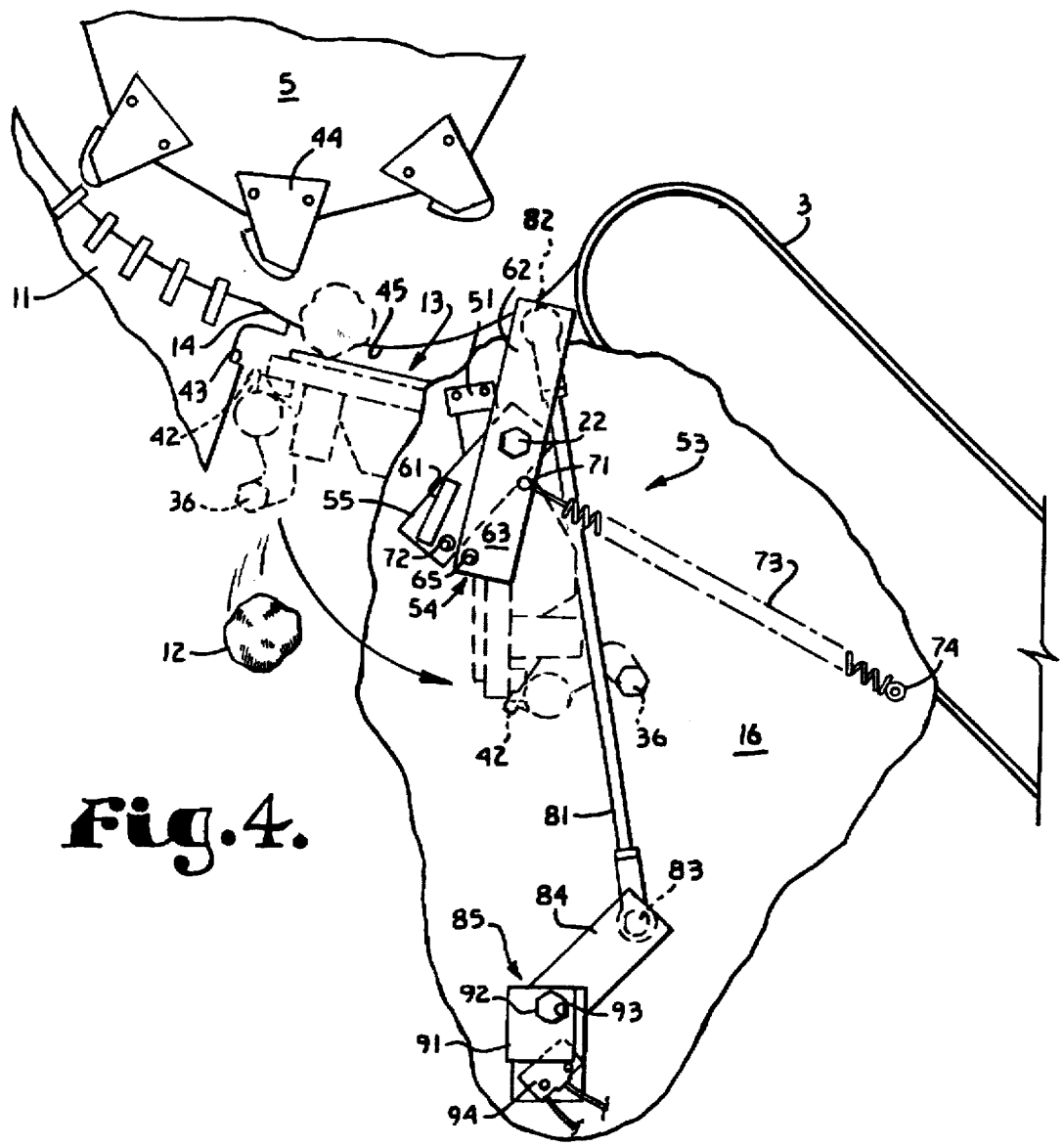
FIG. 4 is a greatly enlarged, fragmentary side elevational view of a portion of the combine including a thresher cylinder, a rock door and an over center assembly with portions of a combine side wall broken away to illustrate the rock door in a closed and latched condition in phantom lines and in an open position in hidden lines and with the over center assembly released.
Figure 5:
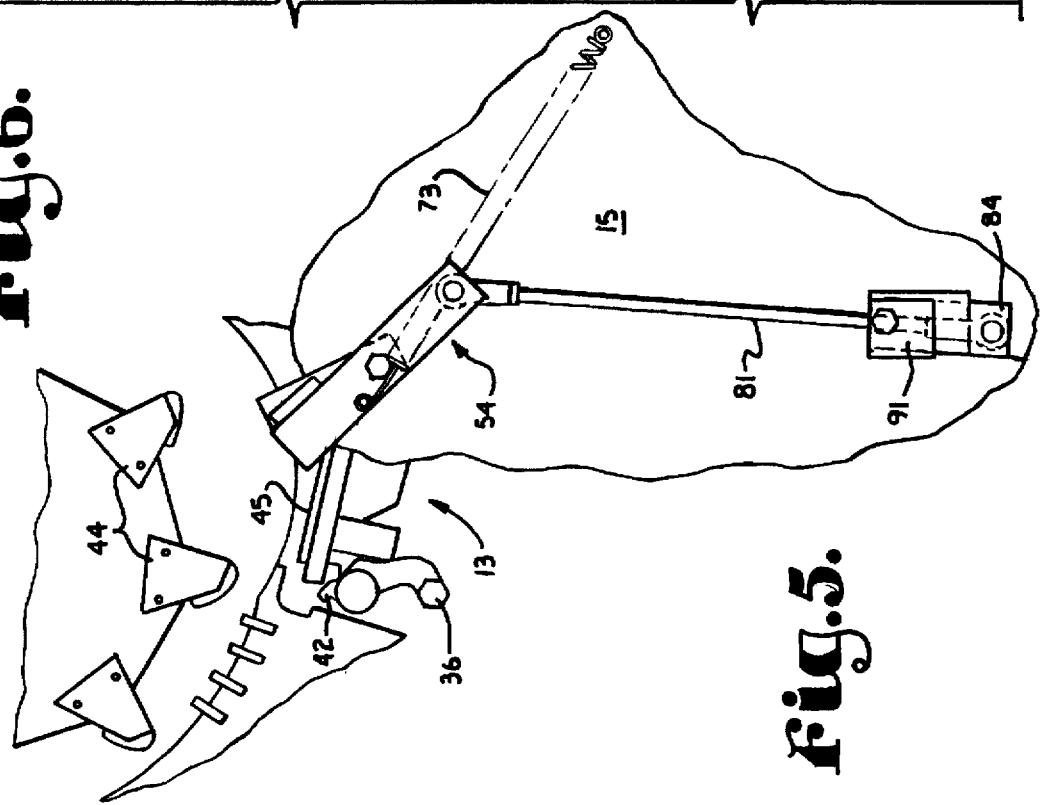
FIG. 5 is an enlarged, fragmentary side elevational view of a portion of the combine including a thresher cylinder, a rock door and an over center assembly with portions of a combine side wall broken away to illustrate the rock door in a closed but unlatched condition and with the over center assembly in an over center position.

In order to close and relatch the rock door 13, an over center closure apparatus is provided, as generally indicated at 53 in FIGS. 2, 4 and 5. The over center closure apparatus 53 includes a first lever arm 54 which is attached to the pivot rod 22 in a manner which allows the first lever arm 54 to freely rotate about the rock door pivot. A second lever arm 55 is rigidly attached to the pivot rod 22 such that the second lever arm 55 rotates along with the rock door pivot. The second lever arm 55 includes a fixed stop member 61 attached thereto in a position in which it engages the first lever arm 54 as if rotates about the rod 22. The first lever arm 54 includes first and second legs 62 and 63 which extend outward in opposite directions from the rod 22 while the second lever arm 55 extends outward in a single direction from the rod 22. First and second apertures 65 and 71 are provided in the second leg 63 of the first lever arm 54 and a third aperture 72 is provided in the second lever arm 55. An elongate coil spring 73 is attached between the second aperture 71 and a bracket 74 attached to the side wall 16 of the combine harvester 1. The spring 73 acts to bias the first lever arm 54 toward a counterclockwise direction.

An elongate linkage arm 81 has one end 82 pivotably attached near the outward end of the first leg 62 of the first linkage arm 54. A second end 83 of the linkage arm 81 is pivotably attached to an over center lever arm 84 in an over center assembly 85. The over center assembly 85 includes a bracket 91 with a rotatable shaft 92 positioned therein which shaft 92 is rigidly attached to the over center lever arm 84 such the shaft 92 and over center lever arm 84 pivot together. The shaft 92 terminates in a hex wrench engaging head 93. An over center limit switch 94 is positioned proximate the bracket 91.

Over Center Apparatus Operation

After the rock door 13 has been pivoted to the open position of FIGS. 1 and 4 by action of the rock 12, as explained above, the operator shuts down the combine harvester 1 in response to the open door indicator switch 51. The operator then opens a large hinged side panel 101 to expose the over center closure apparatus 53. The operator first takes a rake 102 and rakes the area around the rock door 13 free of debris to allow it to freely pivot in a clockwise direction. The operator then takes the wrench 40 (FIG. 6) and attaches it to the wrench engaging head 93 on the over center assembly 85. The wrench 40 is then rotated in a clockwise direction, thus urging the over center lever arm 84 in a clockwise direction until it reaches an over center position, as shown in FIG. 5. The over center lever arm 84 pulls the linkage arm 81 downward, this causing the first lever arm 54 to pivot in a clockwise direction against the action of the spring 73. As the first lever arm 54 pivots in a clockwise direction, it engages the fixed stop member 61 on the second lever arm 55. The first lever arm 54 and the second lever arm 55 are thus constrained to pivot together. The second lever arm 55 thus pivots the rock door 13 from the open position of FIG. 4 to the closed, unlatched position of FIG. 5. The over center position of the over center lever arm 84 holds the first and second lever arms, and thus the rock door 13 in the closed position, allowing the operator to remove the wrench 40 from engagement with the wrench engaging head 93.

The operator then places the wrench 40 into engagement with the wrench receiving head 36 on the rock door latch pin arm 33 and pivots the wrench 40 counterclockwise until the latch pin 35 is engaged in the spring latch 32, thus latching the rock door 13 closed by placing the ledge 42 in position within the detent 43. The operator then removes the wrench 40 from the engaging head 36 and again places it on the wrench engaging head 93 on the over center assembly 85. The wrench 40 is then pivoted in a counterclockwise direction, which also pivots the over center lever arm 84 in a counterclockwise direction. The over center lever arm 84 is thus removed from the over center position, releasing the first lever arm 54 from its closed position and allowing the spring 73 to pull the first lever arm 54 in a counterclockwise direction back toward the position shown in FIG. 2. The rock door 13 is thus closed and latched and the over center lever 84 is released from the over center position. The over center limit switch 94 and the rock door open limit switch 51 are turned off, thus turning off any alarm indicators in the operator's cab 52 associated with the rock door 13. The combine harvester 1 can then be safely operated until another large rock is encountered.

The over center assembly 53 serves one additional function. Under certain conditions the rock door 13 can become jammed in a closed position even when the latch pin 35 is not engaged by the spring latch 35 and, thus, the ledge 42 is not engaged by the recess 43. In order to force the rock door 13 open in such cases, the wrench 40 is engaged with the over center wrench engaging head 93 and the wrench 40 is pivoted clockwise until the first lever arm 54 engages the stop member 61 on the second lever arm 55. A locking pin (not shown) is then inserted through the first aperture 65 on the second leg 63 of the first lever arm 54 and through the third aperture 72 on the second lever arm 55, thus linking the first lever arm 55 and the second lever arm 54 together. The wrench 40 can then be pivoted in a counterclockwise direction, and the combination of the elongate wrench 40, the over center lever arm 84, the linkage arm 81 and the first and second lever arms 54 and 55, respectively, give the operator a considerable mechanical advantage, allowing the rock door 13 to be forced open from a jammed position. Once the rock door 13 is forced open, the locking pin (not shown) is removed from the apertures 65 and 72. The rock door 13 can then be closed and relatched in the manner described above.

It is thus to be understood that while certain forms of the present invention have been illustrated and described herein, it is not to be limited to the specific forms or arrangement of parts described and shown.

What is claimed and desired to be secured by Letters Patent is as follows:

1. In a combine harvester equipped with a rock door, a rock door pivot which pivotably attaches the rock door to said combine harvester such that it is movable between an upper, closed position and a lower, open position, said rock door including a spring latch positioned on said rock door and a spring latch pin positioned on a latch pin arm of said rock door, said latch pin arm being pivotable between a latched position in which the pin engages said spring latch and latches said rock door in said closed position, and an unlatched position which allows said rock door to pivot to said open position, said latch pin being forced from said latched to said unlatched position by a rock striking said rock door, the improvement comprising a rock door over center closure apparatus for facilitating the closing and latching of said rock door by an operator, said apparatus comprising:

a. a first lever arm connected to rotate about said rock door pivot;

b. a linkage arm connected near a first end to said first lever arm; and c. an over center assembly connected near a second end of said linkage arm, said over center assembly being movable between a free rotating position and an over center position, said over center assembly, when in said over center position, causing said first lever arm to hold said rock door in said closed position such that said rock door latch pin arm can be conveniently pivoted to said latched position.

2. An apparatus as in claim 1, and further comprising:
   a. a second lever arm connected to rotate with the rock door pivot; and
   b. a stop member attached to said second lever arm, said stop member being positioned to engage the first lever arm as it rotates about the rock door pivot.

3. An apparatus as in claim 2, wherein said over center assembly includes:
   a. an over center lever arm connected to the linkage arm and positioned to rotate about a pivot axis between said over center position and said free rotating position;
   b. a wrench engaging head for accommodating a wrench for turning said over center lever arm between said free rotating position and said over center position, and wherein:
   c. as the wrench is used to turn the over center lever arm to the over center position, the rock door is closed and held in the closed position by the over center lever arm, the linkage arm, the first lever arm and the second lever arm.

4. An apparatus as in claim 1, wherein:
   a. said first lever arm has a first leg extending outward from said rock door pivot and a second leg extending outward from said rock door pivot in a direction opposite to said first leg, said first leg being connected to said linkage arm, and said second leg including a first bore extending therethrough; and
   b. said second lever arm has a second bore extending therethrough such that said first and second bores are aligned when said first lever is positioned against said stop member on said second lever whereby said first and second lever arms can be linked together via said first and second bores, respectively, such that said over center lever arm can be used to Open said rock door.

5. An apparatus as in claim 1, and further comprising:
   a. a rock door open limit switch positioned to detect an open rock door.

6. An apparatus as in claim 1, and further comprising:
   a. an over center limit switch positioned to detect said over center position.

7. In a combine harvester equipped with a rock door, a rock door pivot which pivotably attaches the rock door to said harvester such that it is movable between an upper, closed position and a lower, open position, said rock door including a spring latch positioned on said rock door and a spring latch pin positioned on a latch pin arm of said rock door, said latch pin arm being pivotable between a latched position in which the pin engages said spring latch and latches said rock door in said closed position, and an unlatched position which allows said rock door to pivot to said open position, said latch pin being forced from said latched to said unlatched position by a rock striking said rock door, the improvement comprising a rock door over center closure apparatus for facilitating the closing and latching of said rock door, said apparatus comprising:
   a. a first lever arm connected to rotate about said rock door pivot;
   b. a second lever arm rigidly connected to the rock door pivot so as to rotate with the rock door;
   c. a stop member attached to said second lever arm, said stop member being positioned to engage the first lever arm as it rotates about the rock door pivot;
   d. a linkage arm connected near a first end to said first lever arm; and
   e. an over center assembly connected near a second end of said linkage arm, said over center assembly being movable between a free rotating position and an over center position, said over center assembly, when in said over center position, causing said first lever arm to hold said rock door in said closed position such that said rock door latch pin arm can be conveniently pivoted to said latched position.

8. An apparatus as in claim 7, wherein said over center assembly includes:
   a. an over center lever arm connected to the linkage arm and positioned to rotate about a pivot axis between said over center position and said free rotating position;
   b. a shaft connected to said over center lever arm with a wrench engaging head for accommodating a wrench for turning said over center lever arm between said free rotating position and said over center position, and wherein:
   c. as a wrench is used to turn the over center lever arm to the over center position, the rock door is closed and held in the closed position by the over center lever arm, the linkage arm, the first lever arm and the second lever arm.

9. An apparatus as in claim 7, wherein:
   a. said first lever arm has a first leg extending outward from said rock door pivot and a second leg extending outward from said rock door pivot in a direction opposite to said first leg, said first leg being connected to said linkage arm, and said second leg including a first aperture extending therethrough; and
   b. said second lever arm has a second aperture extending therethrough such that said first and second apertures are aligned when said first lever is positioned against said stop on said second lever whereby said first and second lever arms can be attached together via said first and second apertures, respectively, such that said over center lever arm can be used to open said rock door.

10. An apparatus as in claim 7, and further comprising:
    a. a rock door open limit switch positioned to detect an open rock door.

11. An apparatus as in claim 7, and further comprising:
    a. an over center limit switch positioned to detect said over center position.

12. In a combine harvester equipped with a rock door, a rock door pivot which pivotably attaches the rock door to said harvester such that it is movable between an upper, closed position and a lower, open position, said rock door including a spring latch positioned on said rock door and a spring latch pin positioned on a latch pin arm of said rock door, said latch pin arm being pivotable between a latched position in which the pin engages said spring latch and latches said rock door in said closed position, and an unlatched position which allows said rock door to pivot to said open position, said latch pin being forced from said latched to said unlatched position by a rock striking said rock door, the improvement comprising a rock door over center closure apparatus for facilitating the closing and latching of said rock door, said apparatus comprising:
    a. a first lever arm connected to rotate about said rock door pivot;

b. a second lever arm rigidly connected to the rock door pivot so as to rotate with the rock door;

c. a stop member attached to said second lever arm, said stop member being positioned to engage the first lever arm as it rotates about the rock door pivot;

d. a linkage arm connected near a first end to said first lever arm; and e. an over center lever arm connected near a second end of said linkage arm, said over center lever arm being pivotable between a free rotating position and an over center position, said over center lever arm, when in said over center position, causing said rock door to be held in said closed position by the over center lever arm, the linkage arm, the first lever arm and the second lever arm such that said rock door latch pin arm can be conveniently pivoted to said latched position.

13. An apparatus as in claim 12, wherein:

a. said first lever arm has a first leg extending outward from said rock door pivot and a second leg extending outward from said rock door pivot in a direction opposite to said first leg, said first leg being connected to said linkage arm, and said second leg including a first aperture extending therethrough; and b. said second lever arm has a second aperture extending therethrough such that said first and second apertures are aligned when said first lever is positioned against said stop on said second lever whereby said first and second lever arms can be linked together via said first and second apertures, respectively, such that said over center lever arm can be used to open said rock door.

14. An apparatus as in claim 12, and further comprising:

a. a rock door open limit switch positioned to detect an open rock door.

15. An apparatus as in claim 12, and further comprising:

a. an over center limit switch positioned to detect said over center position.

* * * * *